(No Model.)
C. F. CLAUS.
PROCESS OF PURIFYING COAL GAS AND OBTAINING AMMONIA AND OTHER PRODUCTS THEREFROM.
No. 337,246. Patented Mar. 2, 1886.
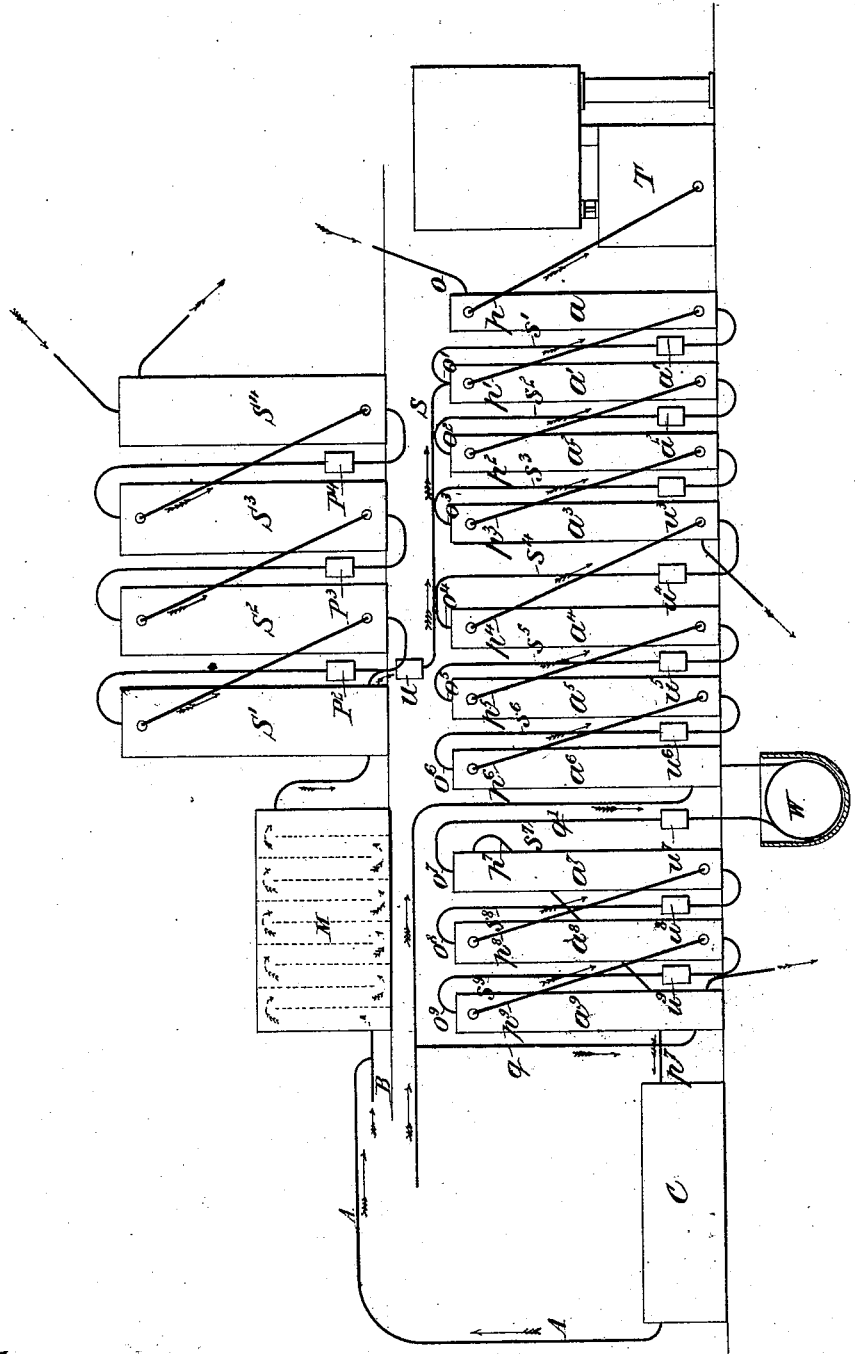

UNITED STATES PATENT OFFICE.

CARL FRIEDRICH CLAUS, OF LONDON, ENGLAND.

PROCESS OF PURIFYING COAL-GAS AND OBTAINING AMMONIA AND OTHER PRODUCTS THEREFROM.

SPECIFICATION forming part of Letters Patent No. 337,246, dated March 2, 1886.

Application filed May 28, 1883. Serial No. 96,457. (No specimens.) Patented in England June 28, 1881, No. 2,838; July 29, 1882, No. 3,608, and September 29, 1882, No. 4,644.

*To all whom it may concern:*

Be it known that I, CARL FRIEDRICH CLAUS, of London, England, chemist, have invented a new and useful Improved Process of Purifying Coal-Gas and Obtaining Ammonia, Ammoniacal Compounds, and Sulphur Therefrom, (for which I have obtained patents in Great Britain No. 2,838, bearing date June 28, 1881; No. 3,608, bearing date July 29, 1882, and No. 4,644, bearing date September 29, 1882,) of which the following is a specification.

My invention relates to the purification of coal-gas by a novel process, whereby ammonia, ammoniacal compounds, and other products are obtained, and wherein some of such products are used, recovered, and reused repeatedly or continuously, while some of them are removed to be otherwise utilized. In carrying into effect the said process dry or practically dry ammoniacal gas (produced in the said process, as hereinafter described) is admitted into the coal-gas after the latter leaves the condensers in a manner so measured and regulated that the quantity of ammonia will not be materially in excess of that theoretically required to take up the acid impurities—such as carbonic acid and sulphide of hydrogen—contained in the coal-gas. By such measured and regulated supply I prevent the carrying away of the excess of ammonia by and in the gas as an impurity, which could only be removed by washing with such large quantities of water as would seriously deteriorate the illuminating power of the gas.

The measuring of the ammoniacal gas may be effected by storing it in suitable holders and permitting it to pass into the coal-gas only through suitable adjustable measuring contrivances or by the means hereinafter specified.

To insure the proper mixture of the gaseous ammonia with the coal-gas, and to afford sufficient time and opportunity for the impurities of the gas to combine with the ammonia before coming in contact with any liquid, I employ large mixing-chambers, through which the coal-gas passes with the ammonia. These chambers should be large enough to hold the quantity of gas produced in the retorts during two, three, or more minutes, and should contain a number of so-called "baffling-plates," which cause the gases to take a tortuous route through the chambers. From the mixing-chamber the products of the combination of gaseous ammonia with the impurities of the coal-gas—viz., carbonate of ammonia and sulphide of ammonium—together with the coal-gas, pass into the scrubbers. Through the last of the scrubbers a shower of water passes downward, and when it arrives at the bottom the water is pumped to the top of the next, and so forth, until it reaches the bottom of the scrubber nearest the mixing-chamber. The carbonate of ammonia and sulphide of ammonium in the gas by passing through the scrubbers in the opposite direction become absorbed in the liquid and form solutions of these salts. Such solutions are the source from which the necessary supplies of ammoniacal gas required for further purification of the coal-gas by my process are obtained in the following manner, viz: I pass carbonic acid (obtained and employed as hereinafter described) through the said solutions of carbonate of ammonia and sulphide of ammonium until all the sulphide of ammonium is converted into carbonate and the sulphide of hydrogen is set free.

In order that the solution of carbonate of ammonia thus obtained for the purpose of my invention should work well, it should not contain more than from two to four per cent. of ammonia. If it is stronger, it should be reduced to this strength by the addition of water. The liquid is then heated in closed vessels to a temperature of from 170° to 190° Fahrenheit. In this process from one-half to three-fourths of the carbonic acid will pass off in a free state as gas, leaving a liquid behind which now contains a corresponding quantity of caustic ammonia in solution. This carbonic acid is employed for the above-described purpose of decomposing the sulphide of ammonium in the crude gas-liquor. The heating of the carbonated gas-liquor may be effected in a closed boiler or by showering it down a coke-tower or two or more of such towers and passing up steam from the bottom of the tower or towers in the opposite direction.

To bring the carbonic acid liberated by the aforementioned process of heating of the carbonated gas-liquor into intimate contact with the crude gas-liquor, the crude gas-liquor is showered down one or more towers, (filled with coke or other porous material, or otherwise arranged to bring about a finely-divided condition of the gas-liquor,) while at the same time the said carbonic-acid gas passes through the tower or towers in the opposite direction. If the crude gas-liquor travels a sufficiently long distance in contact with the carbonic acid, all sulphide of ammonium in the same will be converted into carbonate of ammonia. Sulphide of hydrogen escapes in a free state, and passes in this condition out of the last tower, accompanied by the surplus of carbonic acid—that is to say, the quantity in excess of that required for the decomposition of the sulphide of ammonium present in the crude gas liquor. The quantity or amount of such surplus or excess of carbonic acid can be easily ascertained, and is allowed to escape from that part of the apparatus in which it is still uncontaminated with sulphide of hydrogen. The carbonic acid thus withdrawn from the apparatus need not be wasted, but may be employed for further carbonating the carbonate of ammonia which is continually produced in gas-making in excess of that required for the purpose of gas purification.

The object of the process herein lastly described is to isolate from the gas-liquor in a free state the sulphide of hydrogen, and to obtain it as free of carbonic acid as possible, so that it may be advantageously utilized for the production of sulphur or sulphurous acid from the same by further treatment according to my invention, as hereinafter specified. Now, the liquid obtained by the above-described process of heating the solution of carbonate of ammonia to from 170° to 190° Fahrenheit, which liquor contains one-half to three-fourths of caustic ammonia and one-half to one-fourth of carbonate of ammonia, is that from which by another part of this process the ammoniacal gas for further gas purification is obtained. It is of the greatest importance that the ammonia admitted into coal-gas for the purpose of this mode of purification should be in a truly gaseous form, in order that it may mix with the coal-gas without being condensed or converted into liquid ammonia, and thus withdrawing itself from intimate contact with the said gas before combining with the impurities of the coal-gas. In a truly gaseous condition it will form an intimate mixture with coal-gas and a consequent combination with the impurities previous to its absorption into the liquor or water it meets with in the scrubbers. By any ordinary process of distilling the heated or decarbonated gas-liquor until all the ammonia is expelled from thirty per cent. to fifty per cent. of the water in which they have been dissolved is volatilized along with them.

In order to obtain a regular and continuous supply of dry ammoniacal gas, I subject the above-mentioned heated or decarbonated liquor to a peculiar—that is to say, a continuous—system of distillation, whereby a continuous uninterrupted stream of liquor exhausted of ammonia issues forth at one end of the plant or apparatus, while a continuous uninterrupted current of ammoniacal gas issues forth from the opposite end of the plant. I therefore use a series of stills or other apparatus, constructed and arranged on the principle of Woolf's bottles, which I will call "No. 1," "No. 2," "No. 3," "No. 4," "No. 5," &c. The Woolf's bottles or like apparatus may consist of a number of iron boilers, tanks, or other vessels, or, preferably, of a series of scrubbers or coke-towers; or I may use apparatus such as that known as "Coffey's stills." Into No. 5 of these stills the liquor mentioned above as having been heated to from 170° to 190° Fahrenheit is run in measured quantities and in a regular and continuous stream. From an overflow-pipe in the bottom of No. 5 the liquor runs into No. 4, from No. 4 in the same manner into No. 3, and from No. 3 into No. 2, and thence to No. 1 in a continuous regular stream, so as to about half fill all the stills. Heat is then applied to No. 1 still, and the vapors arising from the still are conveyed out of the top of the same through a pipe to the bottom of No. 2, from the top of this to No. 3, No. 4, and No. 5 in the same manner until ultimately the accumulated gases from all the five stills issue forth through a pipe in the top of No. 5—that is to say, the liquor runs into No. 3, passes through Nos. 5, 4, 3, 2, and ultimately issues from No. 1, exhausted of ammonia, while the vapors as they issue from No. 1 pass thence into No. 2, from No. 2 to No. 3, &c., to No. 5. From No. 1 steam alone passes into No. 2, from No. 2 steam, ammonia, and carbonate of ammonia issue, from No. 3 to No. 4 perhaps more ammonia and carbonate of ammonia than steam will pass, and from No. 5—that is to say, the last of the series, whatever the number of stills may be—nothing but gaseous ammonia and vapors of carbonate of ammonia pass off, all aqueous vapor being left behind in the preceding towers or stills.

To insure the above specified results, it is requisite that the temperature of the last in the series of towers or stills, say Nos. 4 and 5, should not exceed 170° to, say, 180° Fahrenheit, and that the current of liquor passing through this series of towers or stills should be so regulated that the liquor issuing from No. 1 is perfectly free from ammonia, while the contents of No. 2 are nearly free therefrom; and it is further requisite that the steam-supply to No. 1 should be regular or uniform. I find that the best form of still for my process is that commonly called a "coke-tower." Steam (preferably superheated) is passed into the bottom of the first tower, and travels upward, while the liquor from the preceding tower is showered from the top downward in a finely-divided state. The vapor or steam from the first tower enters the bottom of the second tower, while the liquor from the third tower is showered from the top downward, and so forth, until it reaches the end towers, as previously explained. The liquor passing away from No. 1 still or tower, though free from alkilinity, still contains fixed salts of ammonium, especially sulphocyanide of ammonium. I use such liquor (after cooling the same to the temperature of the air) instead of water for washing down the scrubbers of the gas-works. By doing so repeatedly I gradually accumulate the sulphocyanide of ammonium in the liquor, so that when this liquor is sufficiently enriched it is suitable for use as a raw material for the manufacture of commercial sulphocyanides, such as sulphocyanide of barium.

The gaseous ammonia and the vapors of carbonate of ammonia, instead of being passed directly into the circuit of the gas-purification plant, are first conducted through dry-chambers with numerous division or baffling walls. The carbonate of ammonia becomes deposited on these walls, and may subsequently be removed and utilized. This carbonate, or such portion of it as can be spared from the purification of gas, can be converted into bicarbonate by the aid of the carbonic-acid gas obtained in this process, as above described, and may be sold or disposed of in any convenient manner. The gaseous ammonia freed from most of the carbonate is now passed into the coal gas for the purpose of purifying th same, as hereinabove described. There remains now only the sulphide of hydrogen set free by the carbonic acid in the set or series of towers in which the crude gas-liquor has been treated with the same.

The accompanying drawings illustrate a practical apparatus for carrying out my invention.

In practicing my process thereby the operation of the apparatus is as follows: Gaseous ammonia is admitted into the coal-gas (after the latter leaves the condensers) in quantity equivalent to the quantity of carbonic acid and sulphide of hydrogen present in the coal-gas as impurities. To insure a thorough mixing of the ammoniacal gas with the coal-gas, the mixture of gases is allowed to remain in a large mixing-chamber, M, for from three to five minutes. From this mixing-chamber the gaseous mixture passes into the scrubbers of the ordinary gas-plant. The scrubbers are indicated by $S'$ $S^2$ $S^3$ $S^4$. Water runs into $S^4$. When it reaches the bottom of $S^4$, it is raised by the pump $P^4$ to the top of $S^3$. From the bottom of $S^3$ it is raised by the pump $P^3$ to the top of $S^2$, and so on until it reaches the bottom of $S'$. The solution of carbonate of ammonia and sulphide of ammonium (commonly called "crude gas-liquor") is now removed by pumps from the bottom of the scrubbers and transferred to the plant or apparatus (extraneous and additional to the gas-plant) designed for the separation of ammonia from the impurities, which have been removed by the ammonia from the coal-gas in the process of purification and for the separation of carbonic acid from the sulphide of hydrogen with a view to the conversion of such sulphide of hydrogen into commercial sulphur.

The said apparatus comprises a row of towers, $a'$ to $a^9$. The said towers have at the bottom an inlet-pipe and an outlet-pipe. Immediately above these pipes there is a grating or false bottom. In the body of each tower and resting upon the said false bottom I place coke, broken bricks, angle-iron, bars, gratings, or any other suitable material or objects which will expose a large surface of any liquid which may be showered down upon it from above. Near the top of the towers and above the coke or other materials with which they are filled are the upper ends of the outlet-pipes $p$ to $p^9$. Immediately above these outlet-pipes there is a contrivance for producing a fine division of the liquid, so that it may be equally distributed in the form of rain or spray upon the coke or other material in said towers. The towers are closed at the top, but inlet-pipes pass through their tops or covers, and by means of these pipes the liquids are supplied to the liquid-distributing appliances. The crude gas-liquor is raised by the pump $u'$ and pipe $s'$ to the distributing apparatus at the top of tower $a'$, whence it is showered down upon the coke or other material in the said tower, and it passes through the mass of this material until it reaches the bottom of tower $a'$. From the bottom of tower $a'$ it is then raised by pump $u^2$ and pipe $s^2$ to the distributing apparatus of tower $a^2$. It then passes down through the body of tower $a^2$ to the bottom of the same, and is raised by the pump $u^3$ and pipe $s^3$ to the top of tower $a^3$, and so forth, until the same liquor has traversed the whole series of towers. Into the bottom of the tower $a^9$ steam (preferably superheated) is admitted by the steam-pipe $q$. The quantity of steam is so regulated that the liquor when it reaches the bottom of this tower is free from alkalinity. Steam is also admitted into tower $a^6$ by the pipe $q'$, but its admission is so regulated that the liquor arriving at the bottom of this tower never has a higher temperature than 190° to 200° Fahrenheit, which temperature must be carefully and constantly maintained. The crude gas-liquor consisting of a solution of sulphide of ammonium, of carbonate of ammonia, and of a small quantity of sulphocyanide of ammonium as it leaves the scrubbers contains about eight or ten per cent. of ammonia. This proportion is reduced by the addition of water, (from tower $a$,) as hereinafter explained, to such an extent that it only contains about two or two and a half per cent. of ammonia. For reasons, also hereinafter explained, such diluted liquor after it has traveled through towers $a'$ $a^2$ $a^3$ $a^4$, to, say, tower $a^5$, has lost the sulphide of hydrogen it originally contained, and has become a solution principally of carbonate of ammonia, or rather of sesquicarbonate and bicarbonate of ammonia. When this liquor is now heated to 180° Fahrenheit, the carbonic acid combined with the ammonia begins to rapidly leave the ammonia and to volatilize, the ammonia not being volatilized. When the liquid is heated still further to 200° Fahrenheit, the practical maximum loss of carbonic acid has occurred—that is to say, if the heating be continued beyond this point the ammonia would become volatilized—a result which is most undesirable. The carbonic acid, liberated as described, rises in the tower $a^6$, meeting the current of gas-liquor coming in the opposite direction. It passes from the top of the tower $a^6$ by the pipe $p^6$, and enters the bottom of tower $a^5$, thence it rises to the top of tower $a^5$, always meeting the descending gas-liquor traveling in the opposite direction. It passes by the pipe $p^5$ to tower $a^4$, and so on until it reaches the top of tower $a'$. The action of the carbonic acid upon the sulphide of ammonum contained in the gas-liquor during this long passage and contact with the gas-liquor in such a finely state is to decompose the same, thus liberating sulphide of hydrogen, which escapes and ultimately issues from the pipe $p$ to be disposed of as will be subsequently explained. The carbonic acid having taken the place of the sulphide of hydrogen, forms with the ammonia, carbonate and sesquicarbonate, and ultimately, as the liquor approaches the towers $a^3$, $a^4$, and $a^5$, bicarbonate of ammonia, which, meeting the steam in tower $a^6$, becomes decomposed, as above. As there is more carbonic acid in the crude gas-liquor than is necessary to decompose the sulphide of ammonium contained in the same, and as there exists a large store of carbonic acid in the form of carbonates of ammonia in the various towers, the surplus of this substance, when once its quantity has been determined, is drawn off from the towers $a^3$ or $a^4$, where it is still uncontaminated with sulphide of hydrogen. If this is done, the sulphide of hydrogen which passes out of tower $a$ by the pipe $p$ is almost pure sulphide of hydrogen very little contaminated with carbonic-acid gas.

To insure that the sulphide of hydrogen escaping by pipe $p$ does not carry off any ammonia with the sulphide of hydrogen, the washing-tower $a$ is used as a "catch-tower" for the same. Water is run down this tower in considerable quantities, and when it reaches the bottom of the same it is used for the aforementioned purpose of diluting the crude gas-liquor from the scrubbers to the strength required for the proper working of this process. A part of the aforementioned spent liquor from tower $a^9$ after having been cooled to the temperature of the atmosphere may be employed instead of water in this washing-tower, if desired. The sulphide of hydrogen after leaving the washing-tower $a$ is mixed with the required quantity of air, and allowed to pass into the vessel or apparatus T, where it is converted into sulphur, according to the process described in the specification of my former British Letters Patent No. 3,608.

Returning, now, to tower $a^6$, the liquor which arrives at the bottom of the same (after having lost most of the carbonic acid which it contained when leaving tower $a^5$ and $a^4$) now contains only caustic ammonia mixed with that quantity of carbonate of ammonia (one-eighth to one-fourth of the quantity contained) which was left unacted upon by the process of heating the same to 180° to 200° Fahrenheit. From this liquor the ammonia is distilled off in a gaseous form for the purpose of purifying fresh quantities of coal-gas. It is for this purpose raised by pump $u^7$ to the top of tower $a^7$, and allowed to trickle down this tower $a^7$, and when it arrives at the bottom thereof it is raised by pump $u^8$ to the top of tower $a^8$, and from tower $a^8$ to $a^9$, descending in the latter, and meeting on its way the steam, which, as above described, passes from the bottom toward the top of tower $a^9$. It drives before it the ammonia contained in the liquor on entering the tower $a^8$. This ammonia passes off by the pipe $p^8$ to the bottom of tower $a^7$. The liquor leaving the bottom of tower $a^9$ is, as above stated, free from alkalinity, and the ammonia it originally contained travels in the direction of tower $a^8$, in which the temperature is lower than in tower $a^9$, and lowest at the top. In this colder liquid the ammonia becomes absorbed until the liquid is completely saturated with ammonia and can take up no more. The ammonia consequently escapes by pipe $p^7$, accompanied by vapor of carbonate of ammonia. To prevent the passing away of any steam by the pipe $p^7$, the temperature of the liquor at the top of tower $a^7$ should never be allowed to exceed 150° to 170° Fahrenheit. For this reason the gas-liquor which leaves the bottom of tower $a^6$, and which has a temperature of about 200° Fahrenheit, is cooled in the cooling-worm W to about 120° Fahrenheit before it is pumped into tower $a^7$. The mixture of gaseous ammonia and vapor of carbonate of ammonia is now carried into a chamber or vessel, C, in which the carbonate of ammonia is deposited as a crystalline mass, while the gaseous ammonia is allowed to pass by pipe A into the mixing-chamber M, wherein it is mixed with the crude coal-gas from B for purifying the same, (as described at the commencement of this description,) the cycle of operations being thus completed.

Summary and recapitulation:

First. Gaseous ammonia is passed through to a mixing-chamber into the series of gas-scrubbers forming part of the ordinary gas-plant.

Second. The liquor formed in these gas-scrubbers is passed from them through a separate series of coke-towers, and is therein subjected to the action of carbonic acid, whereby all ammonia is converted into carbonate.

Third. The carbonated ammonia-liquor from the second series is conveyed into another distinct series of coke-towers and is heated therein to a temperature from 170° to 190° Fahrenheit, whereby it loses from one-half to three-fourths of its carbonic acid.

Fourth. The carbonic acid thus set free is conducted to the towers in which the second operation is effected.

Fifth. The liquor from the third operation is conducted to another distinct series of coke-towers or other like vessels, and is there distilled. At one end of this series of towers or vessels gaseous ammonia escapes, accompanied by vapors of carbonate of ammonia. At the other end of the said series liquor free from caustic ammonia or carbonates of ammonia issues in a continuous stream.

Sixth. The liquor from the fifth operation, exhausted of ammonia, is used repeatedly for washing down the scrubbers used for the first operation.

Seventh. The mixture of gases and vapors from the fifth operation passes into one or more chambers, where the carbonate of ammonia is deposited, while the gaseous ammonia escapes from the same to be used in the first operation, the cycle of operation being thus completed.

What I claim is—

1. The process herein described of treating crude gas-liquor for decomposing the sulphide of ammonium contained in the same, said process consisting in showering the crude gas-liquor down one or more towers filled with coke or other porous material, and at the same time passing carbonic-acid gas in the opposite direction, whereby the sulphide of ammonium is converted into carbonate of ammonia and the sulphide of hydrogen is set free.

2. In the purification of coal-gas, the method set forth of distilling the crude gas-liquor for the elimination of gaseous ammonia and vapors of carbonate of ammonia, said method consisting in running the liquor, heated as described, through a series of stills, each having an overflow-pipe in the bottom connecting it with the next succeeding still, and a pipe at the top communicating with the bottom of the adjacent still, whereby the liquor passes in one direction through the whole series and the liberated gases in the opposite direction, substantially as described.

3. The process described of purifying gas, consisting in passing gaseous ammonia, which is produced in the manner set forth, together with the gas, into a mixing-chamber previous to the entrance of said gases into the gas-scrubbers of the plant, the liquor formed therein being passed through a separate series of coke-towers, where it is subjected to the action of carbonic acid, thereby setting free sulphide of hydrogen while the carbonated ammonia-liquor is conveyed into a second series of coke-towers, and there heated from 170° to 190° Fahrenheit, the carbonic acid set free being conducted to the first series of coke-towers, while the treated liquor from which it is derived is conducted to another series of coke-towers and there distilled, the gaseous ammonia being separated from the carbonate of ammonia in condensing-chambers and the former returned to the gas-scrubbers, while the liquor, exhausted of ammonia by distillation, is conveyed to the same point for use in washing down the scrubbers, substantially as set forth.

4. The process described of purifying coal-gas, said process consisting in passing said gas, with gaseous ammonia, through a mixing-chamber and into a series of gas-scrubbers, conveying the liquor formed therein through a series of coke-towers, and subjecting it therein to the action of carbonic acid, separating the sulphide of hydrogen from the carbonated ammonia-liquor, and then heating the latter from 170° to 190° Fahrenheit and distilling the heated liquor and condensing the carbonate of ammonia derived therefrom, substantially as described.

CARL FRIEDRICH CLAUS.

Witnesses:
J. B. KNOWLES,
W. R. LOWMAN.